United States Patent [19]

Brescia et al.

[11] Patent Number: 4,546,361

[45] Date of Patent: Oct. 8, 1985

[54] INK JET PRINTING METHOD AND DEVICE

[75] Inventors: Riccardo Brescia, Ivrea; Enrico Manini, Camandona; Edoardo Balbo, Banchette; Alessandro Scardovi, Ivrea, all of Italy

[73] Assignee: Ing. C. Olivetti & C., S.p.A., Ivrea, Italy

[21] Appl. No.: 545,506

[22] Filed: Oct. 26, 1983

[30] Foreign Application Priority Data

Oct. 26, 1982 [IT] Italy ............................ 68245 A/82

[51] Int. Cl.⁴ ............................ G01D 15/16

[52] U.S. Cl. ............................ 346/140 R; 346/1.1

[58] Field of Search ............................ 346/140 R, 1.1; 400/126

[56] References Cited

U.S. PATENT DOCUMENTS

| | | | |
|---|---|---|---|
| 2,951,894 | 9/1960 | Hirsch | 346/140 X |
| 3,683,212 | 8/1972 | Zoltan | 346/140 X |
| 4,336,544 | 6/1982 | Donald | 346/140 X |

*Primary Examiner*—Joseph W. Hartary

*Attorney, Agent, or Firm*—Banner, Birch, McKie & Beckett

[57] ABSTRACT

A droplet of ink 11 is expelled from a nozzle in a wall, so as to strike a printing medium, by suddenly moving the wall towards the ink 11 with which it is in contact. This movement is effected by energizing a piezoelectric sleeve. The ink droplet is expelled by virtue of the inertia of the ink resisting the movement of the wall and creating pressure. Practical embodiments are described in which the wall containing the nozzle is formed by the tapered end of a capillary tube.

12 Claims, 5 Drawing Figures

INK JET PRINTING METHOD AND DEVICE

BACKGROUND OF THE INVENTION

The present invention relates to an ink jet printing method and device. The method is of the type in which the ink is kept in contact with a wall having a nozzle for the ejection of droplets of ink.

In the known printing methods and devices, the transducer normally effects a compression of the ink in a container. In particular, in printing devices in which the nozzle is in a tubular container, the transducer is constituted by a piezoelectric sleeve fixed to the container or constituting the container. The action of compression causes the formation of droplets of ink, the regularity of which is influenced by the frequency of driving and of resonance of the container and by the acoustic waves in the ink in the container. These known devices moreover have the drawback that the unavoidable presence of air bubbles or vapour in the mass of compressed ink reduced the effectiveness of the compression.

SUMMARY OF THE INVENTION

The object of this invention is to provide a printing method and device in which the presence of bubbles in the ink does not affect the efficacy of the ejection of the droplets.

This problem is solved by the printing method according to the invention, which is characterised in that, for the ejection of each droplet, the wall with the nozzle is moved suddenly towards the ink, whereby the ejection is caused as a reaction to the inertia of the ink in following the movement of the wall.

The device for printing by the method of the invention comprises a container closed at one end by the said wall and having a cross-section normal to the axis of the nozzle substantially larger than the cross-section of the nozzle, and a transducer connected to a fixed structure of the device and adapted to displace the container.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
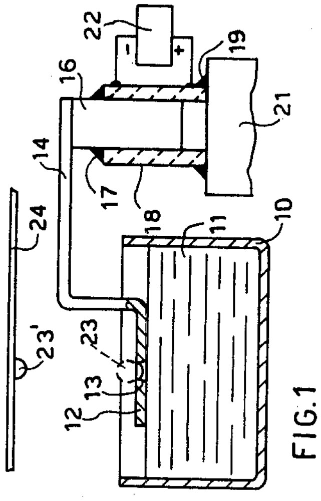
FIG. 1 is a diagram illustrating the printing method according to the invention.

The printing method according to the invention can be illustrated by reference to the diagram of FIG. 1. This shows a vessel 10 in which is disposed a certain amount of liquid 11, such as an ink which is readily dryable and adapted for printing by means of a droplet jet. A wall 12 constituted by a plate which is provided with a capillary hole or nozzle 13 is normally kept in contact with the free surface of the ink 11. The wall 12 is carried by an arm 14 fixed on a cylinder 16. This is connected to one end 17 of a tubular transducer 18, the other end 19 of which is fixed on a fixed structure 21. The transducer 18 is constituted by a sleeve of piezoelectric material adapted to contract when it is subjected to an electric voltage. To this end, the transducer 18 is connected to a pulse generator 22.

Each pulse from the generator 22 produces a sudden contraction of the material of the sleeve 18, the axial component of which causes a shortening of the tube. This then causes the cylinder 16 to move downward suddenly together with the arm 14 and the wall 12. Because of the inertia of the ink 11, this cannot follow the sudden displacement of the wall 12 immediately. Moreover, the section of the nozzle 13 is much smaller than the area of the ink on which the wall 12 acts. Accordingly, a reaction is created which compels a droplet 23 of ink 11 (shown in broken lines in FIG. 1) to squirt through the nozzle 13 at high speed. This droplet 23 can therefore deposit itself at 23' on a printing medium 24.

As is known, the pressure p created by the inertia of the ink on the movement of the wall is given by the formula $p=\rho.c.U$, where $\rho$ is the specific mass of the liquid, c is the specific speed, that is the speed of sound in the liquid, U is the speed of the wall. This formula indicates that the pressure created in this way is independent of the amount of liquid behind the wall, but depends exclusively on the speed U of the wall and on the characteristic impedance $Z_\infty$ of the liquid in the duct, which is given by the formula $Z_\infty=\rho.c$.

It is therefore clear that with this method of printing the ejection of the droplets is caused as a reaction to the inertia of the ink 11, which is unable to follow the movement of the wall 12 instantaneously. It is moreover clear that the reaction is independent of the total mass of the ink and is produced on the ink 11 adjacent the wall 12, for which reason possible air bubbles or vapour in the mass of the ink do not affect either the formation or the speed of the droplets 23.

In a first embodiment of the printing device according to the invention, the printing element or head 25 (FIG. 2) comprises a glass capillary tube 26 having an end portion 27 which is tapered and provided with a nozzle 28. This has a diameter between 30 and 100 $\mu$, preferably 60 $\mu$, while the internal diameter of the tube 26 is substantially larger than that of the nozzle and may be of the order of 1 mm. The tube 26 is connected through a feed duct 29 with a reservoir 31 for the ink 11. The duct 29 is of flexible material, such as rubber or other synthetic resin, to allow a certain axial displacement of the tube 26. Moreover, the duct 29 is of a length such as to allow a transverse movement or displacement of the head with respect to the printing support 24, while the reservoir 31 can remain stationary with respect to the support 24. The reservoir 31 for the ink 11 is arranged at a level such as to ensure that the ink 11 will flow into the tube 26 and bring itself into contact with the inner wall of the portion 27, forming a meniscus in the nozzle 28. The surface tension of the ink 11 is such as normally to prevent the exit of the ink.

The head 25 moreover comprises a transducer constituted by a sleeve 32 of piezoelectric material which is coaxial with the tube 26 and has a certain clearance 30 with respect both to the tube and the duct 29, so as not to prevent the relative axial displacements.

The end 33 of the sleeve 32 adjacent the nozzle 28 is bonded to the tube 26, while the other end 34 is partially fitted into a hole 36 in a fixed plate 37 and bonded to the latter.

The printing head 25 moreover comprises a cover 38 for protecting the sleeve 32 and the tube 26. The cover 38 is fixed to the fixed plate 37 and may have, for example a frustoconical shape. It is filled with silicone resin or rubber 39 to hold in position both the portion 27 of the tube 26 and the piezoelectric sleeve 32, while allowing contractions and expansions of the latter. The piezoelectric sleeve 32 is polarized in the radial direction and is connected by means of two conductors 41 and 42 to a driving circuit 43 adapted to generate selectively a driving pulse 44 having a waveform which is shown in FIG. 3. By way of example, the circuit 43 (FIG. 2) may be of the type described in our European Patent Application No. 83303847 filed on 1.7.83. The pulse 44 produces a radial deformation of a predetermined amplitude per unit of length in the sleeve 32. This deformation does not have any effect, however, because of the clearance 30 between the sleeve and the tube 26. The pulse 44 moreover causes an axial deformation in the sleeve 32 which is less per unit of length than the radial deformation, but in an absolute respect proves much greater, so that the tube experiences a larger displacement and therefore a higher speed of displacement than in the radial direction.

Normally, the circuit 43 keeps the piezoelectric sleeve 32 (FIG. 2) slightly energized with a voltage Va (FIG. 3) so as to maintain its polorization. When the circuit 43 emits a pulse 44, this energizes the piezoelectric sleeve 32 (FIG. 2), as a result of which its end 33 shifts axially with respect to the fixed end 34 following the variation in voltage V of the pulse. The end 33 is followed by the tube 26, which then deforms the flexible tube 29 and deforms the elastic material 39 correspondingly. In particular, at first the pulse 44 (FIG. 3) exhibits a relatively slow reduction of voltage down to the value -Va. This reduction of voltage causes a certain lengthening of the sleeve 32 (FIG. 2) and therefore a movement or displacement of the tube 26 which is substantially followed by the ink 11 without producing any separation of the nozzle 28 and the inner wall of the portion 27 from the ink 11. The pulse 44 (FIG. 3) then exhibits a sudden increase of voltage from -Va to 3Va, causing a sudden shortening of the sleeve 32 (FIG. 2) and a corresponding movement of the tube 26 towards the plate 37. The inner wall of the portion 27 thus shifts towards the ink 11 at a speed such that the ink cannot follow the movement because of the inertia of the ink 11. The pressure due to the reaction of the inertia then creates on the portion of ink disposed in the nozzle 28 a force of expulsion which causes the ejection of a droplet of ink towards the paper 24. Finally, the pulse 44 (FIG. 3) falls back relatively slowly to the initial value Va, causing the sleeve 32 (FIG. 2) and the tube 26 to return to the inoperative position, while the ink 11 forms the meniscus afresh in the nozzle 28.

The force of expulsion F of the droplet is given by the formula $F=p.A$, where p is the pressure seen earlier and A is the projection of the surface of the wall displaced and in contact with the ink, in the plane normal to the direction of displacement, that is the cross-section of the tube 26. From what has been seen before, it is possible to write $F=Z_\infty.U.A.=Z_\infty.Q$, where Q is the capacity of the tube 26, which must be equal to that of the nozzle 28. Therefore, indicating the speed of exit of the droplet by $A_1$, we will have $V=U.A/A_1$, that is the speed of exit is so much the greater the larger the cross-section of the tube 26 and the smaller the cross-section of the nozzle 28. With the above-indicated values of the diameter of the tube 26 and of the nozzle 28, a theoretical speed of the droplet between 3 and 10 m/sec is obtained, while with the values indicated as preferential a speed of about 5 m/sec is obtained, which is considered optimum for the purpose.

It is to be noted that the length of the tube 26 does not have any effect on the phenomenon, so that the tube may also be shorter than the sleeve 32. By this there is obtained the advantage of the greater speed U achievable in the displacement of the end 33 of the sleeve 32 and therefore of the inner wall of the portion 27.

Moreover, the reduction of the length of the tube 26 reduces the time in which the pressure wave within the tube 26 causes a disturbance in the ink in the tube itself.

Figure 2:
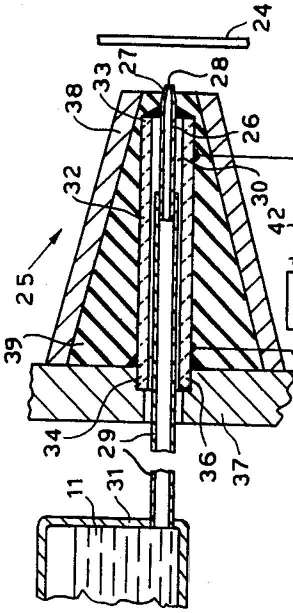
FIG. 2 is a median section of an ink jet printing device according to a first embodiment of the invention.
Figure 3:
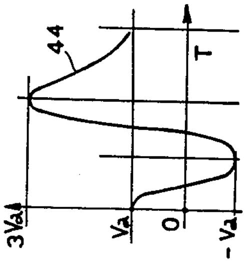
FIG. 3 shows the waveform of a driving pulse of the printing device.
Figure 5:
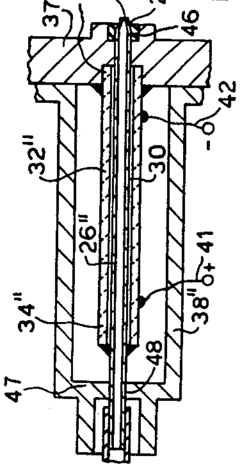
FIGS. 4 and 5 are two sections of two further embodiments of the invention.
Figure 4:
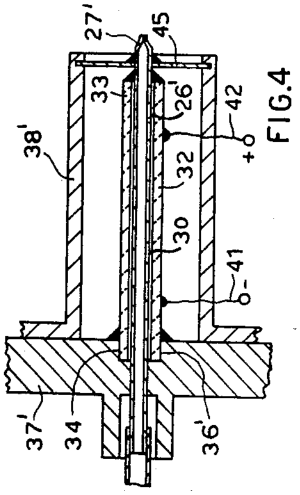

In the two embodiments of FIGS. 4 and 5, the parts similar to those of FIG. 2 are indicated by the same reference numerals as the latter, while the parts which are substantially different are indicated by the same reference numbers provided with primes. In the embodiment of FIG. 4, the tube 26′ passes through the hole 36′ in the plate 37′ and can slide in this hole, ensuring the guiding of the tube 26′ during printing. Moreover, the cover 37 (for the sleeve 32 is cylindrical and is closed by an elastic diaphragm 45 having a central hole in which the end portion 27′ of the tube 26′ is rigidly connected. The diaphragm 45 serves to stabilize the axial movements of the tube 26′, reducing possible undesirable vibrations.

In the embodiment of FIG. 5, the sleeve 32″ is connected to the fixed plate 37″ by its end 33″ adjacent the nozzle 28″, while it is connected to the tube 26″ by its opposite end 34″. The tapered portion 27″ of the tube 26″ is guided in an insert 46 of elastic resin disposed in a recess in the plate 37″ and having a stabilizing function for the tube 26″. The cover 38″ of the sleeve 32″ has a cylindrical shape and terminates in an end wall 47 having a hole 48 in which the end of the tube 26″ can be slidably guided. Because of the connection of the sleeve 32″ to the plate 37″ and the tube 26″, which is inverted with respect to the similar connection of the sleeve 32 of FIGS. 2 and 4, the useful displacement of the portion 27″ of the tube 26″ is now obtained by commanding the expansion of lengthening of the sleeve 32″. Therefore, the connection of the electrodes 41 and 42 to the pulse generator is reversed.

It is understood that various modifications and improvements can be made in the printing method and the printing devices hereinbefore described without departing from the scope of the invention. For example, the tube 26′ of FIG. 4 may be replaced by a tube having a length smaller than the sleeve 32, as in the embodiment of FIG. 1. The ink container bearing the nozzle may assume any other shape, for example prismatic or spherical, and be integrated in a multi-nozzle structure.

We claim:

1. An ink jet printing method comprising the steps of providing a wall with a capillary circular nozzle having a section substantially smaller than the area of the wall, locating a printing support at a predetermined distance from the wall, keeping the wall in contact with a volume of ink, connecting an electric transducer at one end to said wall and at the other end with a frame, and selectively energizing the transducer by an electric pulse to suddenly move the wall toward the ink whereby the reaction of the inertia of the ink in following the movement of the wall causes an ink droplet to be ejected through the nozzle at such a speed as to reach said support.

2. An ink jet printing device comprising a fixed structure, a paper support, a container for the ink, a wall normally contacting the ink and provided with a capillary circular nozzle for the ejection of droplets of ink, said wall being located at a predetemined distance from said support, said nozzle having a section substantially smaller than the area of ink on which the wall acts, an electric transducer connected at one end to said fixed structure and at the other end to said wall, and means for electrically energizing said transducer by an electric pulse to suddenly move said wall toward the ink, whereby the reaction of the inertia of the ink in following the movement of the wall causes an ink droplet to be ejected through the nozzle at such a speed as to reach said support.

3. An ink jet printing device comprising a rigid capillary tube having at one end a coaxial circular nozzle for the ejection of the droplets of ink, a piezoelectric transducer in form of a sleeve coaxial with said tube, said transducer being connected at one end along its axis with said tube and at the other end along said axis with a fixed structure, and pulse generating means for selectively energizing said transducer to suddenly move said tube axially so as to retract its end provided with the nozzle, whereby the reaction of the inertia of the ink in following the movement of the tube causes an ink droplet to be ejected through the nozzle.

4. A device according to claim 3, characterised in that the capillary tube (26) is connected to a reservoir (31) through a duct (29) of flexible material, the fixed structure comprising a protective cover (38) enclosing the piezoelectric sleeve (32) and adapted to allow the displacement of the end of the tube (26) connected to the sleeve.

5. A device according to claim 3, characterised in that the sleeve (32) is connected to the tube (26) at the end (27) of the tube adjacent the nozzle (28), the tube having the said end connected to an elastic guide element (39 or 45).

6. A device according to claim 5, characterised in that the sleeve (32) is normally kept expanded and contracts when it is energized by the ejection command.

7. A device according to claim 5, characterised in that the tube (26) has a length substantially smaller than that of the piezoelectric sleeve (32).

8. A device according to claim 5, characterised in that the cover (38) is substantially frustoconical, with the larger base connected to the fixed structure (37), the cover being filled with elastic material (39) to keep the piezoelectric sleeve (32) and the tube (26) in position.

9. A device according to claim 5, characterised in that the cover (38') is substantially cylindrical and is closed at one end by the fixed structure (27') and at the other end by an elastic diaphragm (45) connected to the tube (26').

10. A device according to claim 3, characterised in that the piezoelectric sleeve (32'') is connected to the tube at the end of the tube opposite to the nozzle (28''), the tube having the end adjacent the nozzle connected to the fixed structure (37'') through a small stabilizing block (46) of elastic material.

11. A device according to claim 10, characterised in that the piezoelectric sleeve (32'') is normally kept contracted and expands when it is energized by the ejection command.

12. A device according to claim 10, characterised in that the protective cover (38'') is substantially cylindrical and is closed at one end by the rigid structure (37'') and at the other by an end wall (47) having a hole (48) in which the tube (26'') slides.

* * * * *